H. WATTON.
Animal-Poke.

No. 166,908.

Patented Aug. 17, 1875.

WITNESSES:
A. B. Robertson.
John C. Kernon

INVENTOR:
Henry Watton
BY
ATTORNEYS.

UNITED STATES PATENT OFFICE.

HENRY WATTON, OF JESUP, IOWA.

IMPROVEMENT IN ANIMAL-POKES.

Specification forming part of Letters Patent No. 166,908, dated August 17, 1875; application filed July 26, 1875.

*To all whom it may concern:*

Be it known that I, HENRY WATTON, of Jesup, in the county of Buchanan and State of Iowa, have invented a new and Improved Animal-Poke; and I do hereby declare that the following is a full, clear, and exact description of the same, reference being had to the accompanying drawing, forming a part of this specification, in which—

Figure 1:
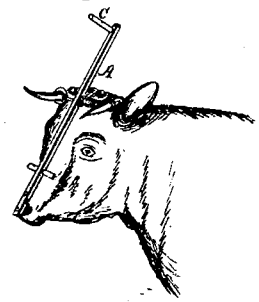
Figure 2:
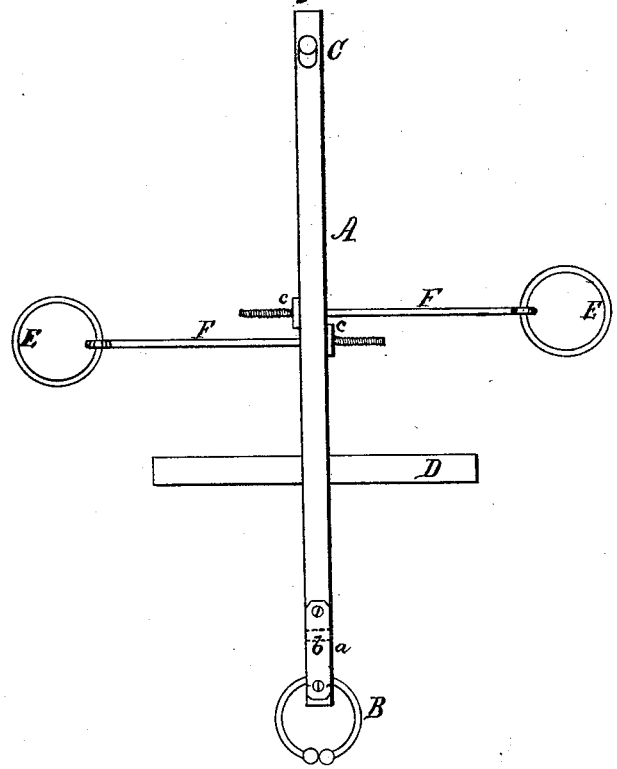

Figure 1 is a perspective view; Fig. 2, a front elevation.

This invention relates to certain improvements in animal-pokes or devices to be attached to unruly cattle to prevent them from breaking through fences, &c. It consists in a bar having at its lower end a ring to be fastened in the animal's nose, and at the upper end a projecting stem or tongue, which takes in the fence when the animal attempts to break through, and pulls the ring in the nose. The said bar is extended a sufficient distance above the animal's head, and is prevented from turning by a cross-bar resting upon the face, the main longitudinal bar being held in position against lateral displacement by rings, which pass over the horns, and are attached to said bar by adjustable rods.

In the drawing, A represents the longitudinal bar, having at its lower end a ring, B, for the animal's nose, the said ring being fastened therein by a slot, *a*, and plate *b*, or other convenient means. The said bar is extended upward upon the face of the animal and above the head, and is provided at the top with a forwardly-projecting stem or tongue, C, which strikes against the fence when the animal attempts to break through, and, pulling the ring upward, gives a painful twitch to the nose, which effectually deters the animal from further attempts. D is a cross-bar resting upon the face of the animal, and attached to bar A, to prevent the latter from turning axially. E are rings adapted to receive the horns, which said rings are fastened to rods F, adjustably attached to bar A. Said rings serve to hold the bar A in proper position upon the animal's face against lateral displacement, and the screw-threaded ends of the rods, with nuts *c*, give an adjustment to the different sizes of heads of cattle, and the width between the horns.

Having thus described my invention, what I claim as new is—

1. An animal-poke adapted to be placed longitudinally upon the face of the animal, having a nose-ring at the lower end, and a forwardly-projecting tongue at the top, as and for the purpose described.

2. The combination, with bar A, having nose-ring B and tongue C, of cross-bar D, and the rings and rods E F, as and for the purpose set forth.

HENRY WATTON.

Witnesses:
 J. A. LEWIS,
 R. E. MARTIN.